_(12)_ United States Patent
Isomura et al.

(10) Patent No.: US 9,555,377 B2
(45) Date of Patent: Jan. 31, 2017

(54) CERAMIC SEPARATION MEMBRANE AND DEHYDRATION METHOD

(71) Applicant: NGK Insulators, Ltd., Nagoya (JP)

(72) Inventors: Manabu Isomura, Nagoya (JP); Naoto Kinoshita, Nagoya (JP); Naoko Inukai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 183 days.

(21) Appl. No.: 14/338,608

(22) Filed: Jul. 23, 2014

(65) Prior Publication Data

US 2014/0331860 A1    Nov. 13, 2014

Related U.S. Application Data

(63) Continuation of application No. PCT/JP2013/055574, filed on Feb. 28, 2013.

(30) Foreign Application Priority Data

Feb. 29, 2012    (JP) .................................. 2012-043198

(51) Int. Cl.
 *B01D 53/22*    (2006.01)
 *B01D 71/02*    (2006.01)
 (Continued)

(52) U.S. Cl.
 CPC ........... *B01D 71/028* (2013.01); *B01D 53/228* (2013.01); *B01D 53/268* (2013.01); *B01D 63/066* (2013.01);
 (Continued)

(58) Field of Classification Search
 CPC ... B01D 71/028; B01D 53/228; B01D 53/268; B01D 63/066; B01D 69/12; B01D 71/02; C01B 39/48; C04B 38/00
 See application file for complete search history.

(56) References Cited

U.S. PATENT DOCUMENTS 4,283,583 A * 8/1981 Velenyi .................... B01J 29/06
                                                             585/467
6,074,457 A    6/2000 Anthonis et al.
(Continued)

FOREIGN PATENT DOCUMENTS

JP    2000-502948 A1    3/2000
JP    2002-253919 A1    9/2002
(Continued)

OTHER PUBLICATIONS

Clark "Explaining the acidity of organic acids" 2012 p. 1-12 <http://www.chemguide.co.uk/basicorg/acidbase/acids.html>.*
(Continued)

*Primary Examiner* — Anthony Shumate
(74) *Attorney, Agent, or Firm* — Burr & Brown, PLLC

(57) ABSTRACT

There is disclosed a ceramic separation membrane. This ceramic separation membrane includes a porous substrate, and a separation layer formed on the substrate. The separation layer is a laminate having an outermost layer positioned on the most surface side, and a base layer positioned in a lower layer than the outermost layer and made of zeolite. The outermost layer is a layer made of a siliceous material containing 90 mol % or more of silica, an organic material-containing amorphous silica material having a Si—C$_n$—Si (wherein n is 1 or 2) bond and a Si/C ratio of 0.5 to 2, or a carbonaceous material containing 90 mass % or more of carbon. The outermost layer is different from the base layer.

10 Claims, 2 Drawing Sheets

(51) Int. Cl.
  *B01D 69/12* (2006.01)
  *C04B 38/00* (2006.01)
  *B01D 53/26* (2006.01)
  *B01D 63/06* (2006.01)
  *C01B 39/48* (2006.01)

(52) U.S. Cl.
  CPC .............. *B01D 69/12* (2013.01); *B01D 71/02* (2013.01); *C01B 39/48* (2013.01); *C04B 38/00* (2013.01)

(56) References Cited

U.S. PATENT DOCUMENTS

| | | | | |
|---|---|---|---|---|
| 6,130,363 | A * | 10/2000 | Benazzi | B01J 29/40 585/481 |
| 6,689,501 | B2 * | 2/2004 | Stone | C08J 5/2275 429/483 |
| 7,279,097 | B2 * | 10/2007 | Tomioka | B01D 67/0088 210/490 |
| 7,585,356 | B2 * | 9/2009 | Oyama | B01D 53/228 95/55 |
| 2003/0039609 | A1 * | 2/2003 | Tomita | B01D 53/228 423/700 |
| 2004/0173094 | A1 * | 9/2004 | Nakayama | B01D 53/228 95/45 |
| 2005/0229779 | A1 | 10/2005 | Nakayama et al. | |
| 2008/0093290 | A1 | 4/2008 | Isomura et al. | |
| 2008/0105627 | A1 | 5/2008 | Isomura | |
| 2009/0007780 | A1 | 1/2009 | Yajima et al. | |
| 2010/0077738 | A1 * | 4/2010 | Cavataio | B01D 53/9418 60/301 |
| 2010/0298115 | A1 * | 11/2010 | Yajima | B01D 61/025 502/4 |
| 2010/0300960 | A1 | 12/2010 | Hishiki et al. | |
| 2011/0129925 | A1 * | 6/2011 | Yan | A61L 27/042 435/402 |
| 2012/0024777 | A1 * | 2/2012 | Sugita | B01D 53/228 210/500.25 |
| 2013/0015134 | A1 | 1/2013 | Ichikawa et al. | |
| 2013/0231515 | A1 * | 9/2013 | Akagishi | B01J 29/40 585/640 |
| 2014/0360938 | A1 * | 12/2014 | Hayashi | C01B 39/48 210/638 |
| 2014/0360939 | A1 * | 12/2014 | Yamada | B01D 69/02 210/638 |
| 2015/0093312 | A1 * | 4/2015 | Yin | B01J 23/40 423/213.5 |
| 2016/0101407 | A1 * | 4/2016 | Wang | B01J 20/20 502/416 |

FOREIGN PATENT DOCUMENTS

| | | |
|---|---|---|
| JP | 2004-066188 A1 | 3/2004 |
| JP | 2009-233540 A1 | 10/2009 |
| JP | 2010-506697 A1 | 3/2010 |
| JP | 2010-509034 A1 | 3/2010 |
| JP | 2011-121040 A1 | 6/2011 |
| WO | 97/25129 A1 | 7/1997 |
| WO | 97/25272 A1 | 7/1997 |
| WO | 2007/119286 A1 | 10/2007 |
| WO | 2008/050812 A1 | 5/2008 |
| WO | 2008/056542 A1 | 5/2008 |
| WO | 2009/119292 A1 | 10/2009 |
| WO | 2011/118469 A1 | 9/2011 |

OTHER PUBLICATIONS

International Search Report and Written Opinion (Application No. PCT/JP2013/055574) dated May 14, 2013, 8 pgs.

* cited by examiner

CERAMIC SEPARATION MEMBRANE AND DEHYDRATION METHOD

BACKGROUND OF THE INVENTION

1. Field of the Invention

The present invention relates to a ceramic separation membrane and a dehydration method, and more particularly, it relates to a ceramic separation membrane in which durability and a separation property is enhanced, and a dehydration method in which this ceramic separation membrane is used.

2. Description of Related Art

Heretofore, to separate a specific component from a mixture of gases or liquids containing an organic material, various methods have been employed in accordance with properties of a substance which is an object of separation. Examples of the various methods include a distillation method, an azeotropic distillation method, a solvent extraction/distillation method, and a separation method by an adsorbent. However, these methods have the problems that a lot of energy is required and that an application range of the separation object is restrictive.

In recent years, as a method replacing the above separation methods, there has been suggested a membrane separation method in which a membrane such as a polymer membrane is used (see Patent Document 1). Examples of the polymer membrane include a carbon membrane and a hollow fiber membrane. This polymer membrane has excellent processing properties. However, the polymer membrane has a problem that a heat resistance is low. Furthermore, the polymer membrane has a low resistance to chemicals, and particularly, the polymer membrane comes in contact with an organic material such as an organic solvent or an organic acid to swell in many cases. Consequently, there has been the problem that the application range of the separation object is restrictive.

On the other hand, there has also been suggested a membrane separation method in which a separation membrane (a ceramic separation membrane) having an inorganic material as in a zeolite membrane or the like is used (see Patent Documents 2 to 5). As to the zeolite membrane, for example, a mixture (an acidic aqueous solution) of an organic material (an acid component such as acetic acid) and water is passed through this zeolite membrane, thereby allowing water to selectively permeate the membrane, so that the water can be removed from the acidic aqueous solution. In other words, when the zeolite membrane is used, the acidic aqueous solution can be concentrated. In such a membrane separation method in which the separation membrane having the inorganic material is used, an amount of the energy to be used can be reduced as compared with the above separation method by the distillation or the adsorbent. Furthermore, the separation can be performed in a broader temperature range than in the polymer membrane.

CITATION LIST

Patent Documents

[Patent Document 1] WO 2011/118469
[Patent Document 2] JP-A-2011-121040
[Patent Document 3] JP-A-2004-066188
[Patent Document 4] JP-A-2010-506697
[Patent Document 5] JP-A-2009-233540

SUMMARY OF THE INVENTION

Problem to be Solved by the Invention

In separation membranes described in Patent Documents 1 and 3 to 5, an acid resistance is high, and hence each separation membrane has durability of four years or more. However, when water is removed from an acidic aqueous solution by use of each of the separation membranes described in Patent Documents 1 and 3 to 5, a concentration of an organic material in a permeated liquid becomes high. That is, there is a disadvantage that the separation membranes described in Patent Documents 1 and 3 to 5 do not sufficiently have a separation performance. On the other hand, in the separation membrane described in Patent Document 2, the acid resistance is enhanced. That is, when the acidic aqueous solution is used as an object to be separated (a mixture of gases or liquids containing an organic material), it can be considered that "the durability is enhanced". However, the separation membrane described in Patent Document 2 has problems that a water permeation speed is low and that a concentration of acetic acid in the permeated liquid is also high (i.e., the separation performance is not sufficient). In consequence, there has earnestly been demanded development of a ceramic separation membrane having a high durability and also having an excellent separation property.

The present invention has been developed in view of such problems of related arts, and an object thereof is to provide a ceramic separation membrane having high durability and also having an excellent separation property, and a dehydration method in which this ceramic separation membrane is used.

Means for Solving the Problem

According to the present invention, there are provided a ceramic separation membrane and a dehydration method described in the following.

According to a first aspect of the present invention, a ceramic separation membrane includes a porous substrate, and a separation layer formed on the substrate is provided, wherein the separation layer is a laminate having an outermost layer positioned on the most surface side, and a base layer positioned in a lower layer than the outermost layer and made of zeolite, the outermost layer is made of a siliceous material containing 90 mol % or more of silica, an organic material-containing amorphous silica material having an Si—C$n$—Si (wherein n is 1 or 2) bond and an Si/C ratio of 0.5 to 2, or a carbonaceous material containing 90 mass % or more of carbon, and the outermost layer is different from the base layer.

According to a second aspect of the present invention, the ceramic separation membrane according to the above first aspect is provided, wherein the base layer is made of chabazite type zeolite.

According to a third aspect of the present invention, the ceramic separation membrane according to the above first or second aspects is provided, wherein the outermost layer is made of DDR type zeolite.

According to a fourth aspect of the present invention, the ceramic separation membrane according to the above third aspect is provided, wherein the outermost layer is made of DDR type zeolite which substantially does not include Al atoms.

According to a fifth aspect of the present invention, the ceramic separation membrane according to any one of the above first to fourth aspects is provided, wherein a thickness of the outermost layer is ½ or less of a thickness of the base layer.

According to a sixth aspect of the present invention, the ceramic separation membrane according to any one of the above first to fifth aspects is provided, wherein the substrate is made of a ceramic material having partition walls defining and forming a plurality of cells extending from one end face to the other end face.

According to a seventh aspect of the present invention, a dehydration method including: supplying, to the ceramic separation membrane according to any one of the above first to sixth aspects is provided, an acidic aqueous solution in a state of a gas phase or a liquid phase to cover a front surface of the outermost layer of the separation layer; and reducing a pressure of a space on the side of a back surface down to a pressure smaller than an atmospheric pressure in a space on the side of the front surface and the space on the side of the back surface of the separation layer which are partitioned by the separation layer, thereby allowing water in the acidic aqueous solution to selectively permeate the space on the side of the front surface to the space on the side of the back surface, to remove said water from the acidic aqueous solution.

Effect of the Invention

A ceramic separation membrane of the present invention includes a porous substrate and a separation layer formed on this substrate. The separation layer has an outermost layer made of a predetermined siliceous material, a predetermined organic material-containing amorphous silica material, or a predetermined carbonaceous material, and a base layer positioned in a lower layer than this outermost layer and made of zeolite. In this manner, the separation layer of the ceramic separation membrane of the present invention includes a zeolite film as the base layer, and this zeolite film has a high separation performance and a fast water permeation speed. Furthermore, the separation layer of the ceramic separation membrane of the present invention includes, as the outermost layer, a film which is made of the predetermined siliceous material, the predetermined organic material-containing amorphous silica material or the predetermined carbonaceous material and which is different from the base layer. Each of the films made of these materials has the separation performance and a high acid resistance. The ceramic separation membrane of the present invention includes the separation layer having the above base layer and the above outermost layer, and therefore has high acid resistance and an excellent separation property. It can be considered that when an acidic aqueous solution is used as an object to be separated, the ceramic separation membrane of the present invention has high durability.

A dehydration method of the present invention is a method in which as a ceramic separation membrane, the ceramic separation membrane of the present invention is used. Therefore, a dehydration treatment is continuously possible for a long time while maintaining a suitable separation performance.

DETAILED DESCRIPTION OF THE INVENTION

Hereinafter, embodiments of the present invention will be described with reference to the drawings. It should be understood that the present invention is not limited to the following embodiments and that also when changes, improvements and the like are suitably added to the following embodiments on the basis of ordinary knowledge of a person skilled in the art without departing from the gist of the present invention, the embodiments fall in the scope of the present invention.

Figure 1:
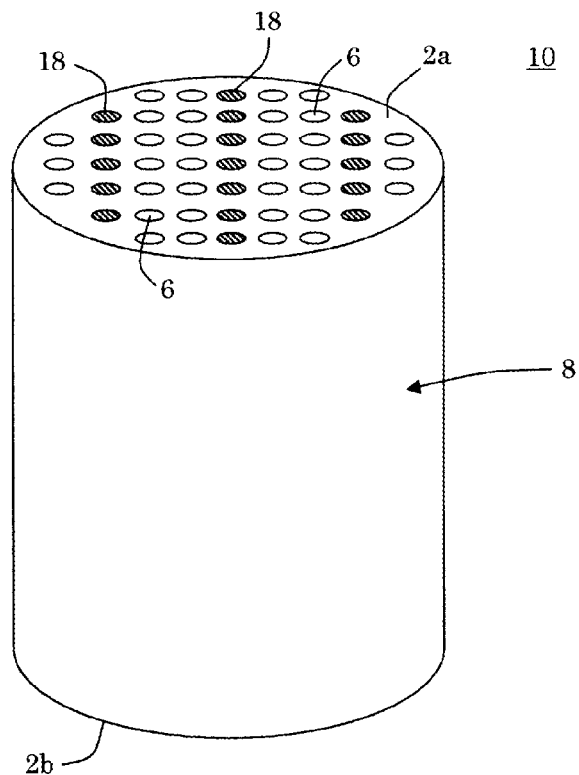
FIG. 1 is a perspective view schematically showing one embodiment of a ceramic separation membrane of the present invention.
Figure 2:
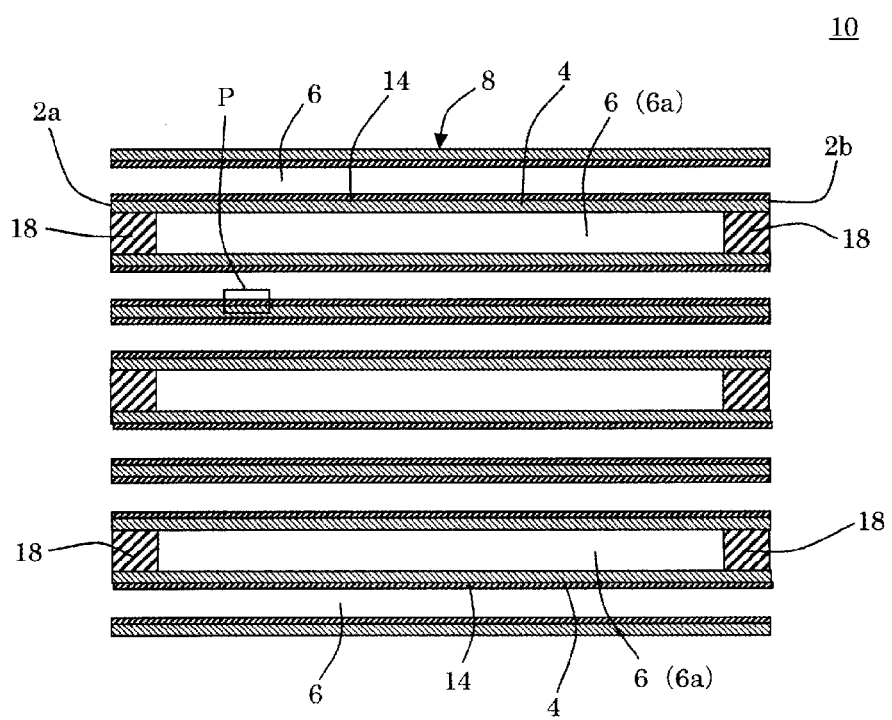
FIG. 2 is a sectional view schematically showing a cross section parallel to an extending direction of cells of the ceramic separation membrane shown in FIG. 1.
Figure 3:
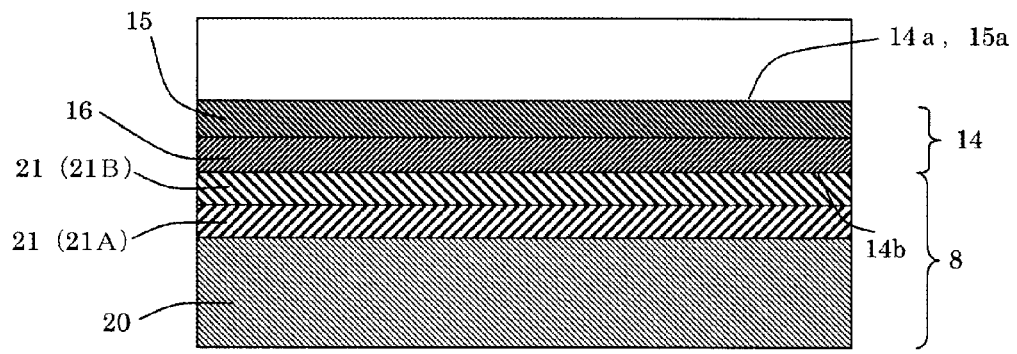
FIG. 3 is a sectional view schematically showing an enlarged region P shown in FIG. 2.

[1] Ceramic Separation Membrane:

One embodiment of a ceramic separation membrane of the present invention includes a porous substrate 8, and a separation layer 14 formed on the substrate 8 as in a ceramic separation membrane 10 shown in FIG. 1 to FIG. 3. The separation layer 14 is a laminate having an outermost layer 15 positioned on the most surface side, and a base layer 16 positioned in a lower layer than the outermost layer 15 and made of a zeolite. That is, in the separation layer 14, the outermost layer 15 is laminated on the base layer 16 as shown in FIG. 3. Furthermore, the outermost layer 15 is a layer made of a siliceous material containing 90 mol % or more of silica, an organic material-containing amorphous silica material having an Si-Cn-Si (wherein n is 1 or 2) bond and an Si/C ratio of 0.5 to 2, or a carbonaceous material containing 90 mass % or more of carbon. Furthermore, the outermost layer 15 is different from the base layer 16. FIG. 1 is a perspective view schematically showing the one embodiment of the ceramic separation membrane of the present invention. FIG. 2 is a sectional view schematically showing a cross section parallel to an extending direction of cells of the ceramic separation membrane shown in FIG. 1. FIG. 3 is a sectional view schematically showing an enlarged region P shown in FIG. 2.

As described above, in the ceramic separation membrane 10, the separation layer 14 includes a zeolite film as the base layer 16, and this zeolite film has a high separation performance and a fast water permeation speed. Furthermore, the separation layer 14 of the ceramic separation membrane 10 includes, as the outermost layer 15, a film which is made of the above siliceous material, the above organic material-containing amorphous silica material, or the above carbonaceous material, and which is different from the base layer 16. Each of the films made of the above materials has a separation performance and a high acid resistance. The ceramic separation membrane 10 includes the separation layer 14 having the base layer 16 and the outermost layer 15, and therefore has the high acid resistance and an excellent separation property.

A reason why the separation layer 14 of the ceramic separation membrane 10 has the high acid resistance is that the outermost layer has the high acid resistance. A further reason is that even if "an acidic aqueous solution containing an acid component" which is an object to be separated permeates the outermost layer 15 to reach the base layer 16, a concentration of the acid component in a permeated liquid (the acidic aqueous solution) which comes in contact with the base layer 16 is low. That is, the base layer 16 comes in contact with what has a lower concentration of the acid component than the acidic aqueous solution. Therefore, deterioration due to the acid component does not easily occur in the base layer 16. As a result, it can be considered that the ceramic separation membrane 10 has the high acid resistance, and has a high durability, when the object to be separated is the acidic aqueous solution.

Furthermore, the separation layer 14 of the ceramic separation membrane 10 is the laminate having the outermost layer 15 and the base layer 16 as described above. In this way, the separation layer 14 is the laminate including the outermost layer 15 and the base layer 16, whereby the separation layer 14 exerts an excellent separation property which cannot be assumed from a case where a single layer of the outermost layer 15 is the separation layer or a case where a single layer of the base layer 16 is the separation layer.

Here, when "the outermost layer is different from the base layer", it is meant that the outermost layer is made of a material different from a material of the base layer or that the material of the outermost layer is the same as that of the base layer, but a crystal structure of the outermost layer is different from that of the base layer. That is, for example, when the base layer is a layer made of chabazite type zeolite, it is meant that the outermost layer is a layer made of a material different from zeolite or made of zeolite other than the chabazite type zeolite.

[1-1] Separation Layer:

As described above, the outermost layer 15 is a layer made of the above siliceous material, a layer made of the above organic material-containing amorphous silica material, or a layer made of the above carbonaceous material. In other words, the outermost layer 15 is a silica film made of the above siliceous material, a carbon-containing amorphous silica film made of the above organic material-containing amorphous silica material, or a carbon film made of the above carbonaceous material. These films have a separation property and also have a high acid resistance. Therefore, the separation layer 14 having the outermost layer 15 formed on the surface thereof does not easily deteriorate even in contact with the acidic aqueous solution including a high concentration of an acid component.

The above siliceous material contains 90 mol % or more of silica, and preferably contains 99.0 mol % or more of silica, and a lower limit value of a content ratio of silica is further preferably 99.5 mol %, and especially preferably 99.9 mol %. On the other hand, an upper limit value is preferably 100 mol %. When the content ratio of silica is smaller than 90 mol %, there is a fear that it is difficult to obtain the outermost layer having a sufficient acid resistance.

Examples of the above siliceous material include DDR type zeolite and amorphous silica. In these examples, the DDR type zeolite is preferable. This is because the DDR type zeolite is crystalline and therefore has a high acid resistance.

The above organic material-containing amorphous silica material has a Si—C$_n$—Si (wherein n is 1 or 2) bond and a Si/C ratio of 0.5 to 2. The above organic material-containing amorphous silica material further preferably has a Si-C$_n$-Si (wherein n is 1 or 2) bond and a Si/C ratio of 1 to 2. When the above Si/C ratio is smaller than 0.5, there is a fear that it is difficult to obtain the outermost layer having a sufficient acid resistance. When the ratio is larger than 2, there is a fear that defects (e.g., cracks and the like) are generated in the outermost layer. It is to be noted that "the Si/C ratio" is a value of a ratio of the number of Si (silicon) atoms to the number of C (carbon) atoms.

An example of the above organic material-containing amorphous silica material is an organic material-containing silica sol. For example, the layer made of the above organic material-containing amorphous silica material can be formed as follows. First, the organic material-containing silica sol is prepared by using bistriethoxy silylethane or bistriethoxy silylmethane as a raw material. Next, this organic material-containing silica sol is diluted with a solvent of ethanol or the like to prepare an organic material-containing silica sol solution. Next, thus prepared organic material-containing silica sol solution is formed into a film on the substrate, and dried. Afterward, the film is fired at 200 to 500° C. in a nitrogen or air atmosphere. In this way, the layer made of the above organic material-containing amorphous silica material can be formed.

The carbonaceous material contains 90 mass % or more of carbon, and a lower limit value of a content ratio of carbon is preferably 95 mass %. On the other hand, an upper limit value is preferably 99 mass %. When the content ratio of carbon is smaller than 90 mass %, there is a fear that it is difficult to obtain the outermost layer having a sufficiently acid resistance.

Examples of the carbonaceous material include a polyimide resin and a phenol resin. The layer made of the carbonaceous material can be formed by forming a film by use of the above resin as a precursor and then performing a heat treatment at 600 to 900° C. in an inert atmosphere.

The outermost layer 15 is preferably made of DDR type zeolite in which a content percentage of Al atoms is 1 mol % or less. The outermost layer is made of the DDR type zeolite in which the content percentage of the Al atoms is 1 mol % or less, so that in the outermost layer 15, the acid resistance enhances and the separation property also enhances.

The outermost layer 15 is further preferably made of "DDR type zeolite which substantially does not include the Al atoms". The outermost layer is made of "DDR type zeolite which substantially does not include the Al atoms", so that the acid resistance of the outermost layer 15 enhances. When "the Al atoms substantially are not included", it is meant that the content percentage of the Al atoms is 0.1 mol % or less. The outermost layer 15 is further preferably made of DDR type zeolite which does not include the Al atoms (i.e., the content percentage of the Al atoms is 0 mol %). When the content percentage of the Al atoms is 0 mol %, the acid resistance of the outermost layer 15 further enhances.

A thickness of the outermost layer 15 is preferably ½ or less of a thickness of the base layer 16. A lower limit value of the thickness of the outermost layer 15 is further preferably 1/10 of the thickness of the base layer 16. On the other hand, an upper limit value is further preferably ⅓. The thickness of the outermost layer 15 satisfies the above conditions, so that in the separation layer 14, "the high separation property" is compatible with "the high water permeation speed". When the thickness of the outermost layer 15 is in excess of ½ of the thickness of the base layer 16, a pressure loss in the outermost layer is large. Therefore, there is a fear that the water permeation speed of the ceramic separation membrane is slow.

The thickness of the outermost layer 15 can suitably be set in accordance with a size of the ceramic separation membrane to be prepared or the like. Specifically, the thickness is preferably from 0.5 to 10 μm. An upper limit value of the thickness of the outermost layer 15 is further preferably 5 μm. The thickness of the outermost layer 15 is in the above range, so that in the separation layer 14, "the high separation property" is compatible with "the high water permeation speed". When the thickness of the outermost layer 15 is smaller than the above lower limit value, it is difficult to uniformly form a film of the outermost layer 15, and there is a fear that the whole surface of the base layer 16 cannot be covered. In this case, there is a fear that durability and separation performance of the ceramic separation membrane deteriorate. On the other hand, when the thickness is in excess of the above upper limit value, the pressure loss in the outermost layer 15 is large. Therefore, there is a fear that the water permeation speed of the ceramic separation membrane is slow.

The outermost layer 15 may be a single layer or multilayered. When the outermost layer is multilayered, materials and crystal structures of respective layers constituting the outermost layer 15 may be the same or different.

The base layer 16 is positioned in the lower layer than the outermost layer 15 and made of zeolite. The base layer 16 has a high separation performance and a fast water permeation speed. The base layer 16 itself has the high separation performance and the fast water permeation speed, and hence the base layer 16 only formed on the substrate can be used as the ceramic separation membrane. However, the outermost layer 15 is formed on the base layer 16, which makes it possible to obtain the ceramic separation membrane having a higher separation performance and a faster water permeation speed.

The base layer 16 is preferably made of chabazite type zeolite in the zeolite. The base layer 16 is constituted of the chabazite type zeolite, which makes it possible to obtain the ceramic separation membrane having further preferable separation property.

It is to be noted that the base layer (i.e., a chabazite film) made of chabazite type zeolite has a high separation performance and a fast water permeation speed. However, when the chabazite film is only used as the separation layer and, for example, an acetic acid aqueous solution having an acetic acid concentration of 50 mass % or more (the acetic acid aqueous solution of the high concentration) is dehydrated, a problem occurs that the concentration of acetic acid in the permeated liquid increases with an elapse of predetermined time after the start of the dehydration. That is, the single layer of the chabazite film has a problem that durability against the acetic acid aqueous solution of the high concentration is not sufficient.

To solve such a problem, in recent years, a chabazite film having a high Si/Al ratio has been reported (see Patent Document 2). However, when the Si/Al ratio increases (becomes high), a hydrophilic property decreases and hence the water permeation speed lowers. Furthermore, there is a problem that the concentration of acetic acid in the permeated liquid becomes high. In this way, in the single layer of the chabazite film, it is difficult to exert the high acid resistance and exert the excellent separation property. On the other hand, in the separation layer of the ceramic separation membrane of the present invention, the above outermost layer is formed on a zeolite film such as the chabazite film. According to such a constitution, it is possible to obtain the ceramic separation membrane having the high acid resistance and the excellent separation property.

The thickness of the base layer 16 can suitably be set in accordance with the size of the ceramic separation membrane to be prepared, or the like. Specifically, the lower limit value of the thickness of the base layer 16 is preferably 1 μm. On the other hand, the upper limit value is preferably 20 μm. When the thickness of the base layer 16 is smaller than the above lower limit value, it is difficult to uniformly form the base layer 16. Consequently, there is a fear that all the surfaces of cells 6 of the substrate 8 cannot be covered. In this case, there is a fear that the separation performance of the ceramic separation membrane deteriorates. On the other hand, when the thickness is in excess of the above upper limit value, the pressure loss in the base layer 16 is large. Consequently, there is a fear that the water permeation speed of the ceramic separation membrane is slow.

In the base layer 16, the Si/Al ratio is preferably from 5 to 1000. A lower limit value of the Si/Al ratio is further preferably 8. An upper limit value is further preferably 100. When the Si/Al ratio of the base layer 16 is in the above range, it is possible to obtain the ceramic separation membrane having the high water permeation speed, the high separation property and the high acid resistance. When the Si/Al ratio of the base layer 16 is smaller than the above lower limit value, there is a fear of occurrence of a disadvantage that the acid resistance of the base layer 16 deteriorates. On the other hand, when the ratio is in excess of the above upper limit value, the hydrophilic property of the base layer 16 deteriorates. Consequently, there is a fear that the water permeation speed of the ceramic separation membrane lowers. It is to be noted that "the Si/Al ratio" is a value of a ratio of the number of Si (silicon) atoms to the number of Al (aluminum) atoms.

The base layer 16 may be a single layer or multilayered. When the base layer is multilayered, crystal structures of respective layers constituting the base layer 16 may be the same or different.

[1-2] Substrate:

The substrate is a supporter to support the separation layer. A shape of the substrate is not limited to a monolith shape shown in FIG. 1 but can suitably be selected. Examples of the shape of the substrate include a honeycomb shape, a disc shape, a polygonal plate shape, a tubular shape such as a cylindrical shape or a square tubular shape, and a column shape such as a columnar shape or a prismatic columnar shape. In these examples, the monolith shape or the honeycomb shape is preferable. This is because a ratio of a film area to a capacity or a weight is large. "The monolith shape" is such a shape as shown in FIG. 1. Specifically, a plurality of cells extending from one end face to the other end face are defined and formed in the shape. In other words, it can be considered that the shape is a lotus root shape.

The substrate is preferably made of a ceramic material having partition walls defining and forming a plurality of cells extending from one end face to the other end face. When the substrate 8 shown in FIG. 2 is used, the separation layer 14 is formed on the surfaces of the cells 6 of the substrate 8.

Examples of the ceramic material constituting the substrate 8 include alumina ($Al_2O_3$), titania ($TiO_2$), mullite ($Al_2O_3 \cdot SiO_2$), zirconia ($ZrO_2$), and silica ($SiO_2$). In these examples, alumina is preferable from the viewpoint of a high corrosion resistance.

An average pore diameter of the substrate 8 is determined in consideration of a balance with a mechanical strength, a surface roughness of the substrate, an amount of the water to be permeated and the like. The average pore diameter of the substrate 8 is preferably, for example, from 0.01 to 1.0 μm. A lower limit value of the average pore diameter of the substrate 8 is further preferably 0.05 μm. On the other hand, an upper limit value is further preferably 0.5 μm. When the average pore diameter is in the above range, the base layer 16 can be formed into a thin film having a thickness of 20 μm or less. When the average pore diameter of the substrate 8 is smaller than 0.01 μm, there is a fear that the pressure loss in a separation treatment is high. On the other hand, when the average pore diameter is larger than 1.0 μm, there is a fear that the base layer 16 cannot be formed in a uniform thickness on the surfaces of the cells 6 of the substrate 8. The average pore diameter of the substrate 8 is a value measured by a bubble point method.

A porosity of the substrate 8 is preferably from 25 to 45%. A lower limit value of the porosity of the substrate 8 is further preferably 30%. On the other hand, an upper limit value of the porosity of the substrate 8 is further preferably 40%. When the porosity of the substrate 8 is smaller than 25%, there is a fear that an amount of a separation object component (e.g., water in the acidic aqueous solution) permeating the ceramic separation membrane is small. On the other hand, when the porosity of the substrate 8 is larger than 45%, there is a fear that the strength of the substrate 8 deteriorates. The porosity of the substrate 8 is a value measured by Archimedes method.

The monolithic substrate 8 includes plugging portions 18 which plug both open ends of each predetermined cell 6 (6a) as shown in FIG. 1 and FIG. 2. The plugging portions 18 are made of the same material as that of the substrate 8.

Furthermore, in the monolithic substrate 8, at least one end face 2a and another end face 2b of the substrate 8 may be coated with coating films made of an impermeable material such as glass. These coating films can prevent the object to be separated (the acidic aqueous solution) and the permeated liquid from being mixed. Specifically, this coating film preferably coats portions other than the open ends of the cells 6 in both the end faces and both end portions of a side face of the substrate 8. It is to be noted that when both the end portions of the side face of the substrate 8 are coated with the coating film, a length of a portion which covers the side face (a length of an extending direction of the cells 6) is preferably from 10 to 30 mm.

As the substrate 8, as shown in FIG. 3, it is preferable to use a substrate including a substrate main body 20 and an intermediate layer 21 formed on the surface of each cell of the substrate main body 20. The substrate main body 20 is made of a ceramic material having partition walls defining and forming a plurality of cells extending from one end face to the other end face. The intermediate layer 21 is a layer formed on the surface of each cell of the substrate main body 20. In the intermediate layer 21, there are formed pores having an average pore diameter smaller than an average pore diameter of the substrate main body 20 and larger than the average pore diameter of the separation layer. It is to be noted that the intermediate layer 21 may be one layer or include a plurality of layers. When the intermediate layer 21 is included and the separation layer 14 is formed, aggregate particles in slurry to form the separation layer 14 can be trapped in the intermediate layer 21. Therefore, it is possible to prevent the aggregate particles from entering the insides of the pores of the substrate main body 20.

An example of a material constituting the substrate main body 20 and the intermediate layer 21 is the same material as the material (the ceramic material) constituting the substrate 8. Furthermore, an average pore diameter and a porosity of the substrate main body 20 can be in ranges similar to the examples of the ranges of the average pore diameter and the porosity of the substrate 8.

Examples of a shape of each of the cells 6 (a shape in a cross section perpendicular to a current direction of a fluid) include a round shape, an elliptic shape, a quadrangular shape, a hexagonal shape, and a triangular shape. In these examples, the round shape is preferable. This is because the separation layer of a uniform film thickness can be formed on the surface of the wall forming each of the cells 6.

There is not any restriction on the whole shape of the monolithic substrate 8, as long as the separation perfor-mance of a separator is not disturbed. Examples of the whole shape of the monolithic substrate 8 include a columnar shape, a quadrangular prismatic columnar shape, and a triangular prismatic columnar shape.

There is not any restriction on a size of the substrate 8. The size of the substrate 8 can suitably be selected in accordance with a purpose to such an extent that a strength required for the supporter of the separation layer is satisfied and a permeability of the separation object component is not impaired. When the monolithic substrate 8 is columnar, dimensions thereof can be, for example, an outer diameter of 2 to 200 mm, and a length of 10 to 2000 mm.

[2] Manufacturing Method of Ceramic Separation Membrane:

For example, the ceramic separation membrane 10 can be manufactured as follows.

[2-1] Preparation of Substrate:

First, the porous substrate 8 is prepared as follows. Specifically, first, in ceramic powder (a forming raw material) which is a material to form the substrate, a binder, a surfactant, a pore former if necessary, and the like are suitably contained, and a dispersing medium and water are added and kneaded to obtain a kneaded material. Next, the obtained kneaded material is extruded by using a die to prepare a monolithic formed body. Next, the obtained formed body is dried and fired to prepare a porous fired body of a monolith shape. Next, a glass paste is applied to both end faces of the prepared fired body, and heated at a predetermined temperature. In this way, it is possible to obtain a monolithic porous supporter in which sealing portions are formed in both the end faces of the fired body. This porous supporter has partition walls defining and forming a plurality of cells extending from one end face to the other end face. This porous supporter can be used as the substrate.

It is to be noted that there is not any restriction on a method of drying the formed body. Examples of the method of drying the formed body include electromagnetic heating methods such as microwave heating drying and high frequency dielectric heating drying. It is to be noted that calcination may be performed prior to firing the dried body. This calcination is performed for degreasing. The calcination can be performed, for example, at 550° C. in an oxidizing atmosphere for about three hours. The firing (main firing) is a heating step of sintering and densifying the forming raw material to acquire a predetermined strength. Firing conditions (a temperature and a time) vary with a type of forming raw material, and hence appropriate conditions may be selected in accordance with the type thereof.

Furthermore, a material in which the intermediate layer is formed on the surface of each cell of the above porous supporter can be used as the substrate. The intermediate layer can be formed by forming a film on the surface of each cell of the above porous supporter by a filtering film formation method by use of raw materials such as alumina particles, followed by the firing.

[2-2] Formation of Separation Layer:

Next, the separation layer having the base layer and the outermost layer is formed on the prepared substrate. Specifically, first, the base layer is formed, and then the outermost layer is formed.

For example, the base layer made of chabazite type zeolite (CHA type zeolite) can be formed as follows. First, on the basis of a structure conversion method of an FAU type zeolite which is described by M. Itakura et al., Chemistry Letters vol. 37, No. 9 (2008) 908, chabazite seed crystals (CHA seed crystals) are manufactured. Next, the CHA seed crystals are dispersed in water to prepare seed crystal dispersion liquid. Next, the prepared seed crystal dispersion liquid is regulated so that a concentration of the CHA seed crystals is from 0.001 to 0.3 mass % to prepare seeding slurry liquid. This seeding slurry liquid is poured into the cells of the above substrate to form a coating film, followed by forced-air drying. In this way, "a seeded substrate" is prepared.

Next, there is prepared a raw material solution including the FAU type zeolite subjected to a de-Al treatment. Afterward, the above "seeded substrate" is immersed in the prepared raw material solution, to perform a heating treatment (hydrothermal synthesis), followed by the firing. In this way, the substrate having the base layer made of chabazite type zeolite is prepared.

Next, the outermost layer is formed. For example, the outermost layer made of DDR type zeolite can be formed as follows. First, DDR type zeolite crystal powder is manufactured on the basis of a method of manufacturing the DDR type zeolite which is described by M. J. den Exter, J. C. Jansen, H. van Bekkum, Studies in Surface Science and Catalysis vol. 84, Ed. by J. Weitkamp et al., Elsevier (1994) 1159-1166 or JP-A-2004-083375. Afterward, the manufactured DDR type zeolite crystal powder is ground to obtain seed crystals. The obtained seed crystals are dispersed in water, and then coarse particles are removed, to obtain seed crystal dispersion liquid.

Next, the obtained seed crystal dispersion liquid is diluted with ion-exchanged water or ethanol, and regulated so that a concentration of the DDR type zeolite is from 0.001 to 0.36 mass % to obtain seeding slurry liquid. Next, the seeding slurry liquid is poured into the cells of the above "substrate having the base layer", and passed through the above cells, followed by the forced-air drying. In this way, "a DDR seeded substrate" is prepared.

Next, a solution including 1-adamantaneamine dissolved in ethylenediamine is prepared. Next, silica sol is added to the above solution to prepare a raw material solution. Afterward, the above "DDR seeded substrate" is immersed in the above raw material solution, to perform the heating treatment (the hydrothermal synthesis), followed by the drying. Next, an organic molecule (1-adamantaneamine) which is a template agent is removed by the heating treatment. In this way, it is possible to form the outermost layer made of DDR type zeolite on the base layer made of chabazite type zeolite. As described above, it is possible to prepare the ceramic separation membrane in which the separation layer is formed on "the surfaces of the walls defining and forming the cells of the substrate".

[3] Dehydration Method:

In one embodiment of a dehydration method of the present invention, an acidic aqueous solution is supplied to the ceramic separation membrane 10 in a state of a gas phase or a liquid phase to cover a front surface 15a of the outermost layer 15 of the separation layer 14, and a pressure of a space 34 on the side of a back surface 14b is reduced down to a pressure smaller than an atmospheric pressure in a space 32 on the side of a front surface 14a and the space 34 on the side of the back surface 14b of the separation layer 14 which are partitioned by the separation layer 14. In this way, water in the above acidic aqueous solution is allowed to selectively permeate the space 32 on the side of the front surface 14a to the space 34 on the side of the back surface 14b, to remove the water from the above acidic aqueous solution. In such a dehydration method, the ceramic separation membrane 10 is used, and hence a suitable dehydration treatment can continuously be performed for a long time. It is to be noted that "to cover the front surface 15a of the outermost layer 15" means to cover the whole front surface 15a of the outermost layer 15. Hereinafter, "the space on the side of the back surface of the separation layer" will be referred to as "the space of a secondary side" sometimes.

Figure 4:
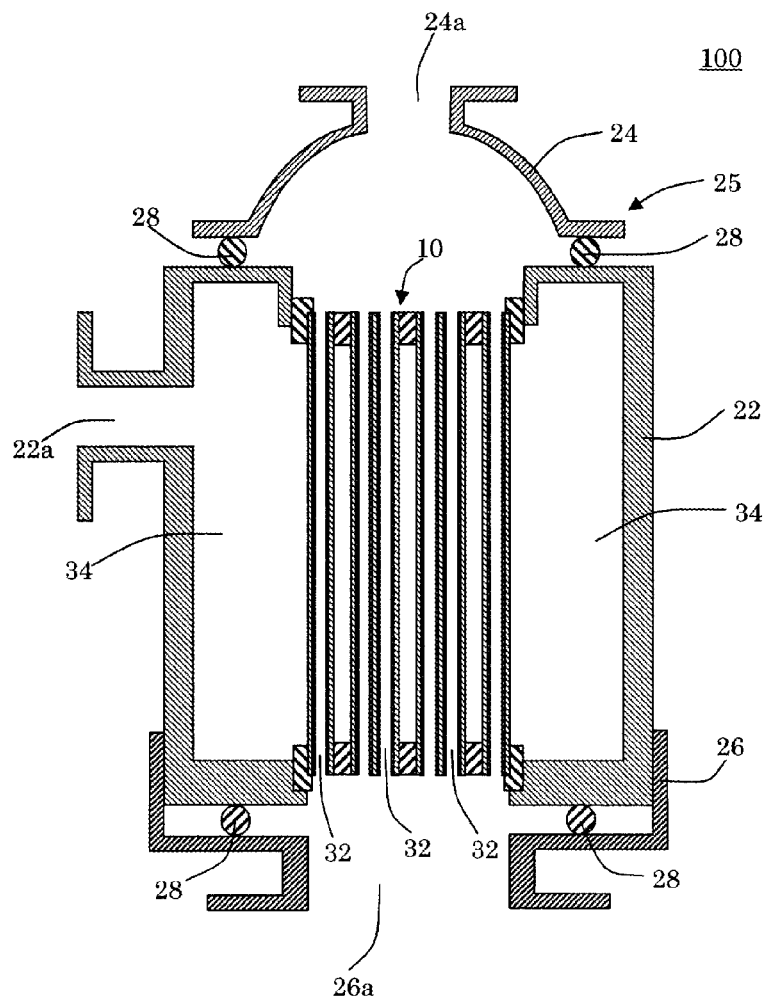
FIG. 4 is a sectional view schematically showing a dehydration device for use in one embodiment of a dehydration method of the present invention.

In the dehydration method of the present embodiment, water is removed from the above acidic aqueous solution by use of a dehydration device 100 shown in FIG. 4. The dehydration device 100 shown in FIG. 4 is constituted of the ceramic separation membrane 10, and a receiving container 25 to receive the ceramic separation membrane 10. FIG. 4 is a sectional view schematically showing the dehydration device for use in the one embodiment of the dehydration method of the present invention.

The receiving container 25 is constituted of a hollow tubular receiving container main body 22, an upper cap 24 attached to an upper end thereof, and a bottom cap 26 attached to a lower end. In the vicinity of an upper end portion of the receiving container main body 22, a filtrate outlet 22a to feed out a filtrate is formed. In a top portion of the upper cap 24, an undiluted solution discharge port 24a to discharge the object to be separated (the acidic aqueous solution) is formed. In a lower end portion of the bottom cap 26, there is formed an undiluted solution supply port 26a through which the object to be separated can be supplied to the ceramic separation membrane 10. Furthermore, a flange is attached to each of these openings. By this flange, "a pipe connecting the receiving container 25 to another member" is easily connected to the receiving container 25. Between the receiving container main body 22 and the upper cap 24 and between the receiving container main body 22 and the bottom cap 26, O-rings 28 made of an elastic material are interposed, respectively. The receiving container 25 is constituted of an impermeable material (stainless steel or the like) having a high corrosion resistance.

Examples of the acidic aqueous solution include an acetic acid aqueous solution and a sulfuric acid aqueous solution.

A condition such as a temperature of the acidic aqueous solution in the dehydration method of the present invention can suitably be changed in accordance with the acidic aqueous solution for use. The temperature of the acidic aqueous solution can specifically be from 50 to 150° C.

There is not any restriction on the pressure of the space 34 on the side of the back surface 14b of the separation layer 14, as long as the pressure is reduced down to the pressure smaller than the atmospheric pressure. The pressure is preferably reduced so that a pressure difference between "the space 32 on the side of the front surface 14a of the separation layer 14" and "the space 34 on the side of the back surface 14b of the separation layer 14" is, for example, from 0.05 to 1 MPa.

The pressure in the space 34 on the side of the back surface 14b of the separation layer 14 can specifically be from 0.001 to 0.1 MPa.

EXAMPLES

Hereinafter, the present invention will specifically be described on the basis of examples, but the present invention is not limited to these examples.

Example 1

Preparation of Substrate

First, a substrate main body made of alumina of a monolith shape was prepared. In this substrate main body, an outer diameter was 30 mm, a length in an extending direction of cells was 160 mm, an open diameter of each cell was 2.5 mm, the number of the cells was 55, an average pore diameter was 10 µm, and porosity was 35%. Next, on the surface of each cell of this substrate main body, there was formed an intermediate layer 21 (21A) having a thickness of 100 µm and an average pore diameter of 0.5 µm and including alumina as a main component (see FIG. 3). Next, on the surface of the intermediate layer 21 (21A), there was formed an intermediate layer 21 (21B) having a thickness of 10 µm and an average pore diameter of 0.1 µm and including alumina as a main component (see FIG. 3). In this way, a substrate (a substrate of the monolith shape) having partition walls defining and forming a plurality of cells extending from one end face to the other end face as shown in FIG. 1 was prepared. Next, a glass paste was applied to both the end faces of the substrate and fired to form sealing portions. In the prepared substrate, the maximum pore diameter by a bubble point test specified in JIS K 3832:1990 was 2.5 µm or less.

(Formation of Separation Layer)

Next, a separation layer was formed on the surface of each cell of the prepared substrate as follows.

(Formation of Base Layer)

(Preparation of Seed Crystals)

On the surface of each cell of the prepared substrate, a base layer of chabazite type zeolite was formed. Specifically, first, chabazite seed crystals (CHA seed crystals) were manufactured on the basis of a structure conversion method of FAU type zeolite. As to the structure conversion method of FAU type zeolite, a method described by M. Itakura et al., Chemistry Letters vol. 37, No. 9 (2008) 908 was employed. Next, the CHA seed crystals were dispersed in water to prepare seed crystal dispersion liquid.

(Seeding (Particle Adhering Step))

Next, the prepared seed crystal dispersion liquid was regulated so that a concentration of the CHA seed crystals was from 0.001 to 0.3 mass % to prepare a seeding slurry liquid. Afterward, the above substrate was fixed to a lower end of a wide-mouthed funnel so that an end face turned upward. Afterward, 160 ml of the seeding slurry liquid was poured from the above wide-mouthed funnel into the above substrate and passed through the cells. Afterward, the substrate into which the above slurry was poured was subjected to forced-air drying at room temperature for ten minutes, by blowing air into the cells at an air speed of 5 m/second. In this way, "a seeded substrate" was prepared.

(Film Formation (Film Forming Step))

Next, CHA type zeolite was synthesized by the structure conversion method of FAU type zeolite. Specifically, first, FAU type zeolite, benzyltrimethylammonium, sodium chloride and ion-exchanged water were placed into a wide-mouthed bottle made of fluororesin to obtain 200 g of solution at a molar ratio of $SiO_2:0.03Al_2O_3:0.2BTMA:0.1NaCl:10H_2O$. Afterward, the solution was stirred for one hour to prepare a raw material solution. As to FAU type zeolite, there was used FAU type zeolite subjected to a de-Al treatment at 75° C. in a 1M sulfuric acid aqueous solution for five hours. Afterward, the above "seeded substrate" was disposed in an inner cylinder of a pressure resistant container made of stainless steel (with the inner cylinder having an inner capacity of 300 ml and made of fluororesin). Afterward, the prepared raw material solution was placed into the inner cylinder, to perform a heating treatment (hydrothermal synthesis) at 120° C. for ten days. After the hydrothermal synthesis, the inner cylinder was cooled, sufficiently washed, and then dried at 70° C. for 16 hours. Afterward, the firing was performed at 550° C. for ten hours. In this way, the substrate having the base layer made of chabazite type zeolite (the CHA type zeolite) was prepared.

(Formation of Outermost Layer)

(Preparation of Seed Crystals)

First, DDR type zeolite crystal powder was manufactured on the basis of a method of manufacturing DDR type zeolite described in JP-A-2004-083375. Afterward, the manufactured DDR type zeolite crystal powder was ground to obtain seed crystals. The obtained seed crystals were dispersed in water, and coarse particles were removed, to obtain seed crystal dispersion liquid.

(Seeding (Particle Adhering Step))

Next, the obtained seed crystal dispersion liquid was diluted with ion-exchanged water and regulated so that a concentration of the DDR type zeolite crystal powder was 0.02 mass %. Afterward, the dispersion liquid was stirred at 300 rpm by use of a stirrer to obtain seeding slurry liquid. Next, the above "substrate having the base layer" was fixed to a lower end of a wide-mouthed funnel so that an end face turned upward. Afterward, 160 ml of the seeding slurry liquid was poured from the above wide-mouthed funnel into the above "substrate having the base layer" and passed through the cells. Afterward, the above "substrate having the base layer", into which the above slurry was poured, was subjected to forced-air drying at room temperature for ten minutes by blowing air into the cells at an air speed of 3 m/second. The above operation (the operation of pouring the seeding slurry liquid and performing the forced-air drying) was repeated three times to prepare "a DDR seeded substrate". Afterward, a microstructure observation by an electron microscope was carried out, to confirm that particles of DDR type zeolite adhered to the surfaces of the cells of the substrate.

(Film Formation (Film Forming Step))

Next, 7.35 g of ethylenediamine (manufactured by Wako Pure Chemical Industries, Ltd.) was placed into a 100 ml wide-mouthed bottle made of fluororesin. Afterward, 1.156 g of 1-adamantaneamine (manufactured by Aldrich Co.) was further added, and dissolved so that a precipitate of 1-adamantaneamine was not left, to obtain a dissolved solution. Next, 98.0 g of 30 mass % silica sol ("Snowtex S" manufactured by Nissan Chemical Industries, Ltd.) and 116.55 g of ion-exchanged water were placed into another container, and lightly stirred. Afterward, this was added to the above solution and strongly shaken. In this way, the raw material solution was prepared. Afterward, the wide-mouthed bottle containing this raw material solution was set to a homogenizer and stirred for one hour. Afterward, the above "DDR seeded substrate" was disposed in the inner cylinder of the pressure resistant container made of stainless steel (with the inner cylinder having an inner capacity of 300 ml and made of fluororesin). Afterward, the prepared raw material solution was placed into the inner cylinder, to perform the heating treatment (the hydrothermal synthesis) at 140° C. for ten hours. After the hydrothermal synthesis, the inner cylinder was cooled, sufficiently washed, and then dried. In this way, a hydrothermal synthetic product was obtained. Afterward, by use of an electric furnace, a temperature of the obtained hydrothermal synthetic product was raised to 400° C. at a rate of 0.1° C./minute in the air atmosphere, and held for four hours. Afterward, the hydrothermal synthetic product was cooled down to room temperature at a rate of 1° C./minute, and an organic molecule (1-adamantaneamine) which was a template agent was removed from the above hydrothermal synthetic product. In this way, the outermost layer made of DDR type zeolite was formed on the base layer, to prepare a ceramic separation membrane in which the separation layer was formed on the surfaces of the cells of the substrate. This outermost layer made of this DDR type zeolite was made of a siliceous material containing 100 mol % of silica.

The prepared ceramic separation membrane was broken in a perpendicular direction to the extending direction of the cells, and a broken face was observed by using a scanning type electron microscope. In this ceramic separation membrane, the base layer had a thickness of 7 μm and the outermost layer had a thickness of 3 μm. Furthermore, a Si/Al ratio of the base layer was 10.

As to the prepared ceramic separation membrane, a separation test and an evaluation of durability were carried out by a method described as follows.

[Separation Test]

By use of such a dehydration device as shown in FIG. 4, an acetic acid aqueous solution of 90° C. is passed through the prepared ceramic separation membrane at a liquid feed speed of 10 L/minute, and a pressure in a space of a secondary side is reduced to a vacuum degree of 100 Torr. As to the acetic acid aqueous solution, an aqueous solution having a concentration of 90 mass % of acetic acid and 10 mass % of water is used. Next, a liquid which has permeated the ceramic separation membrane to the space of the secondary side is trapped by a liquid nitrogen trap. The permeated liquid is trapped for one hour, and a mass of the trapped permeated liquid and the concentration (mass %) of acetic acid in the permeated liquid are measured. The concentration of acetic acid in the permeated liquid is measured by a titration method. Afterward, a water permeation speed is calculated by the following equation.

$$\text{water permeation speed}(kg/m^2h) = W \times (1-(C/100))/\text{an area of a separation layer/a trap time of the permeated liquid} \quad \text{Equation:}$$

(wherein W is a mass (kg) of the trapped permeated liquid, and C is the concentration (mass %) of acetic acid in the permeated liquid).

[Durability]

The above "separation test" is continuously carried out, and "a time until the concentration of acetic acid in permeation water increases to a value of 1.5 times a value of 50 hours after the start of the test". The durability is evaluated in accordance with a length of this measurement time. The results are shown in Table 1. It is to be noted that in Table 1, "DDR" of a column of "material" of "the outermost layer" indicates that the outermost layer is a layer made of DDR type zeolite. "Amorphous silica" indicates that the outermost layer is "a layer made of amorphous silica" described as follows. "Organic material-containing amorphous silica" indicates that the outermost layer is "a layer made of an organic material-containing amorphous silica material" described in the following. "Carbonaceous" indicates that the outermost layer is "a layer made of a carbonaceous material" described as follows. "Silica content 100 mol %" of a column of "composition" of "the outermost layer" indicates that the outermost layer is made of "a siliceous material containing 100 mol % of silica". "Silica content 90 mol %" indicates that the outermost layer is made of "a siliceous material containing 90 mol % of silica". "Si/C ratio=1" indicates that the outermost layer is made of "an organic material-containing amorphous silica material having a Si/C ratio of 1". "Carbon content 90 mass %" indicates that the outermost layer is made of "a carbonaceous material containing 90 mass % of carbon".

"CHA" of a column of "material" of "the base layer" indicates that the base layer is "a layer made of chabazite type zeolite".

TABLE 1

| | Outermost layer | | | Base layer | | | Concentration of acetic acid in permeated liquid (mass %) | Water permeation speed (kg/m²h) | Durability (hours) |
|---|---|---|---|---|---|---|---|---|---|
| | Composition | Material | Thickness (μm) | Material | Si/Al ratio | Thickness (μm) | | | |
| Example 1 | Silica content 100 mol % | DDR | 3 | CHA | 10 | 7 | 0.05 | 1.1 | 500 or more |
| Example 2 | Silica content 100 mol % | Amorphous silica | 3 | CHA | 10 | 7 | 0.07 | 1.2 | 500 or more |
| Example 3 | Si/C ratio = 1 | Organic material-containing amorphous silica | 3 | CHA | 10 | 7 | 0.07 | 1.2 | 500 or more |
| Example 4 | Carbon content 90 mass % | Carbonaceous | 3 | CHA | 10 | 7 | 0.15 | 1.4 | 500 or more |
| Example 5 | Silica content 100 mol % | DDR | 3 | CHA | 3 | 7 | 0.05 | 1.2 | 300 |
| Example 6 | Silica content 100 mol % | DDR | 5 | CHA | 10 | 5 | 0.05 | 0.5 | 500 or more |
| Example 7 | Silica content 90 mol % | DDR | 3 | CHA | 10 | 7 | 0.05 | 1.3 | 400 |
| Comparative Example 1 | — | — | — | CHA | 10 | 10 | 0.20 | 1.2 | 100 |

Examples 2 to 7 and Comparative Example 1

The procedures of Example 1 were repeated except that an outermost layer and a base layer satisfied conditions shown in Table 1, to prepare each ceramic separation membrane. Afterward, as to the prepared ceramic separation membrane, a separation test and an evaluation of durability were carried out in the same manner as in Example 1. The results are shown in Table 1.

The outermost layers in Examples 2 to 7 ("the layer made of amorphous silica", "the layer made of an organic material-containing amorphous silica material" and "the layer made of a carbonaceous material") were formed as follows, respectively.

(Layer Made of Amorphous Silica)

(Preparation of Silica Sol)

First, tetraethoxysilane was hydrolyzed in the presence of nitric acid to obtain a silica sol liquid. Afterward, the obtained silica sol liquid was diluted with ethanol, and regulated so that a concentration of water was from 0.03 to 3 mass %. What was regulated was a film forming silica sol liquid.

(Film Formation)

Next, an outer peripheral surface of "a substrate having the base layer" prepared in the same manner as in Example 1 was masked with a masking tape, and the substrate was fixed to a flow-down film forming device so that an end face turned upward. Afterward, the above film forming silica sol liquid was stored in a tank of this flow-down film forming device. Afterward, the above film forming silica sol liquid was supplied from the upside of the above "substrate having the base layer", and passed through cells of the above "substrate having the base layer". Afterward, air was blown from the upside of the above "substrate having the base layer" at an air speed of 5 m/second, and surplus of the above film forming silica sol liquid was removed. Additionally, it was confirmed that an applied film of the above film forming silica sol liquid was formed on the whole surfaces of the cells.

(Drying)

Next, to dry the applied film of the above film forming silica sol liquid, air of room temperature was passed through the cells of the above "substrate having the base layer" for 30 minutes to dry the above applied film by use of a dehumidification blower. Additionally, an air speed of the air to be passed through the cells was from 5 to 20 m/second, and an air dew point was from −70 to 0° C.

(Firing)

Next, the masking tape attached to the outer peripheral surface of the above "substrate having the base layer" was removed, and the above "substrate having the base layer" was fired. Specifically, a temperature was raised to 500° C. on a condition of 25° C./hour by an electric furnace. Afterward, the temperature of 500° C. was held in the air atmosphere for one hour. Afterward, the temperature was lowered on the condition of 25° C./hour. In this way, the outermost layer which was "the layer made of amorphous silica" was formed, to obtain the ceramic separation membrane.

(Layer Made of Organic Material-Containing Amorphous Silica Material)

In the preparing method of the above (layer made of amorphous silica), bistriethoxysilylethane was used in place of tetraethoxysilane used in the preparing step of the film forming silica sol liquid. Furthermore, firing conditions were changed from "the holding of 500° C. in the air atmosphere for one hour" to "the holding of 300° C. in nitrogen for one hour". As to the other conditions, the same method as in the preparing method of the above (layer made of amorphous silica) was employed. In this way, the outermost layer which was "the layer made of the organic material-containing amorphous silica material" was formed, to obtain the ceramic separation membrane.

(Layer Made of Carbonaceous Material)

(Preparation of Film Forming Liquid)

A commercially available phenol resin ("Bellpearl S899" manufactured by Air Water Inc.) was dissolved in N-methyl-2-pyrrolidone and regulated into a concentration of 10 mass %, to obtain a film forming liquid.

(Film Formation)

Next, "a substrate having a base layer" prepared in the same manner as in Example 1 was dip-coated with the above film forming liquid, and then dried. Afterward, a heat treatment was carried out at 750° C. in a vacuum atmosphere for one hour. In this manner, a carbon film was formed.

(Loading Treatment)

Next, the obtained carbon film was subjected to "a penetration treatment" with ethanol for five minutes, and then heated at 100° C. for 64 hours. Here, "the penetration treatment" is a treatment method of supplying a liquid of ethanol to the whole surface on one side of the carbon film, and reducing a pressure of a space on the other surface side to forcibly pass ethanol through the carbon film. In this way, the outermost layer which was "the layer made of the carbonaceous material (i.e., the carbon film)" was formed, to obtain the ceramic separation membrane.

As it is clear from Table 1, in the ceramic separation membranes of Examples 1 to 7, the concentration of acetic acid in the permeated liquid was small as compared with the ceramic separation membrane of Comparative Example 1. As a result, it is seen that in the ceramic separation membranes of Examples 1 to 7, an amount of acetic acid to permeate the separation layer is small. Therefore, it is possible to confirm that each of the ceramic separation membranes of Examples 1 to 7 have a suitable separation performance. Furthermore, in the ceramic separation membranes of Examples 1 to 7, "the time until the concentration of acetic acid in the permeation water increased to the value of 1.5 times the value of 50 hours after the start of the test" was long as compared with the ceramic separation membrane of Comparative Example 1. Therefore, it is possible to confirm that the durability is excellent.

Comparative Example 1 only includes the separation layer made of chabazite type zeolite (i.e., the separation layer which does not have the outermost layer). In Comparative Example 1, the concentration of acetic acid in the permeated liquid is 0.2 mass %. On the other hand, each of the ceramic separation membranes of Examples 1 to 7 includes the separation layer having the outermost layer, and hence the concentration in each membrane is lower than 0.2 mass % (the concentration of acetic acid in the permeated liquid is 0.15 mass % or less). The reason for this is as follows.

In the film made of chabazite type zeolite (the chabazite film), the lower the concentration of acetic acid in the supplied liquid (the acetic acid aqueous solution) is, the lower the concentration of acetic acid in the permeation water becomes. The outermost layer has a separation property poorer than that of the chabazite film, but still has a separation performance. Therefore, when the acetic acid aqueous solution permeates the outermost layer, the concentration of acetic acid is lower than that of the supplied liquid. Furthermore, the base layer comes in contact with acetic acid of the concentration lower than that of the permeated liquid. As a result, the concentration of acetic acid in the permeated liquid can be reduced.

INDUSTRIAL APPLICABILITY

The ceramic separation membrane of the present invention can be utilized as, for example, a filter to selectively separate a specific substance (water) from an acidic aqueous solution. A dehydration method of the present invention can be employed as, for example, a method of selectively separating water from an acidic aqueous solution to perform dehydration.

DESCRIPTION OF REFERENCE NUMERALS $2a$: one end face, $2b$: the other end face, 4: partition wall, 6: cell, $6a$: predetermined cell, 8: substrate, 10: ceramic separation membrane, 14: separation layer, 15: outermost layer, 16: base layer, 18: plugging portion, 20: substrate main body, 21, 21A and 21B: intermediate layer, 25: receiving container, 22: receiving container main body, $22a$: filtrate outlet, 24: upper cap, $24a$: undiluted solution discharge port, 26: bottom cap, $26a$: undiluted solution supply port, 28: O-ring, 32: space on the side of a front surface of the separation layer, 34: space on the side of a back surface of the separation layer, and 100: dehydration device.

The invention claimed is:

1. A ceramic separation membrane comprising a porous substrate, and a separation layer formed on the substrate,
wherein the separation layer is a laminate having an outermost layer positioned on the outermost surface side, and a base layer made of zeolite positioned in a lower layer than the outermost layer,
the outermost layer is a layer made of DDR type zeolite, and
the DDR zeolite of the outermost layer is different from the zeolite of the base layer.

2. The ceramic separation membrane according to claim 1, wherein the base layer is made of chabazite type zeolite.

3. The ceramic separation membrane according to claim 1,
wherein the outermost layer is made of DDR type zeolite which substantially does not include Al atoms.

4. The ceramic separation membrane according to claim 1,
wherein a thickness of the outermost layer is ½ or less of a thickness of the base layer.

5. The ceramic separation membrane according to claim 1,
wherein the substrate is made of a ceramic material having partition walls defining and forming a plurality of cells extending from one end face to the other end face.

6. A dehydration method comprising: supplying, to the ceramic separation membrane according to claim 1, an acidic aqueous solution in a state of a gas phase or a liquid phase to cover a front surface of the outermost layer of the separation layer; and reducing a pressure of a space on a filtrate side of the separation layer to a pressure smaller than atmospheric pressure in a space on a solution side of the separation layer which are partitioned by the separation layer, thereby allowing water in the acidic aqueous solution to selectively permeate the space on the solution side of the front surface to the space on the filtrate side of the back surface, to remove said water from the acidic aqueous solution.

7. A dehydration method comprising: supplying, to the ceramic separation membrane according to claim 2, an acidic aqueous solution in a state of a gas phase or a liquid phase to cover a front surface of the outermost layer of the separation layer; and reducing a pressure of a space on a filtrate side of the separation layer to a pressure smaller than atmospheric pressure in a space on a solution side of the separation layer which are partitioned by the separation layer, thereby allowing water in the acidic aqueous solution to selectively permeate the space on the solution side of the front surface to the space on the filtrate side of the back surface, to remove said water from the acidic aqueous solution.

8. A dehydration method comprising: supplying, to the ceramic separation membrane according to claim 3, an acidic aqueous solution in a state of a gas phase or a liquid phase to cover a front surface of the outermost layer of the separation layer; and reducing a pressure of a space on a filtrate side of the separation layer to a pressure smaller than atmospheric pressure in a space on a solution side of the separation layer which are partitioned by the separation layer, thereby allowing water in the acidic aqueous solution to selectively permeate the space on the solution side of the front surface to the space on the filtrate side of the back surface, to remove said water from the acidic aqueous solution.

9. A dehydration method comprising: supplying, to the ceramic separation membrane according to claim 4, an acidic aqueous solution in a state of a gas phase or a liquid phase to cover a front surface of the outermost layer of the separation layer; and reducing a pressure of a space on a filtrate side of the separation layer to a pressure smaller than atmospheric pressure in a space on a solution side of the separation layer which are partitioned by the separation layer, thereby allowing water in the acidic aqueous solution to selectively permeate the space on the solution side of the front surface to the space on the filtrate side of the back surface, to remove said water from the acidic aqueous solution.

10. A dehydration method comprising: supplying, to the ceramic separation membrane according to claim 5, an acidic aqueous solution in a state of a gas phase or a liquid phase to cover a front surface of the outermost layer of the separation layer; and reducing a pressure of a space on a filtrate side of the separation layer to a pressure smaller than atmospheric pressure in a space on a solution side of the separation layer which are partitioned by the separation layer, thereby allowing water in the acidic aqueous solution to selectively permeate the space on the solution side of the front surface to the space on the filtrate side of the back surface, to remove said water from the acidic aqueous solution.

* * * * *